May 16, 1944. E. W. WEAVER 2,349,064

TRANSMISSION MECHANISM

Original Filed Aug. 13, 1941

INVENTOR.
Elwin W. Weaver,
BY Hull & West,
ATTORNEYS

Patented May 16, 1944

2,349,064

UNITED STATES PATENT OFFICE 2,349,064

TRANSMISSION MECHANISM

Elverton W. Weaver, Cleveland Heights, Ohio, assignor to Towmotor Co., Cleveland, Ohio, a copartnership consisting of Lester M. Sears, Ruth P. Sears, Mary Ann Sears, and Anna L. Sears Original application August 13, 1941, Serial No. 406,640. Divided and this application May 1, 1942, Serial No. 441,302

2 Claims. (Cl. 74—606)

This invention relates to transmission mechanism, and more particularly to transmission mechanism such as is particularly well adapted for use in connection with the driving assemblies employed in industrial trucks of the general character shown, described and claimed in my application 406,640, filed August 13, 1941 (now Patent No. 2,299,445, dated Oct. 20, 1942), of which this application is a division.

It is the general purpose and object of my invention to provide a transmission mechanism and housing so constructed and located as to enable the input shaft and the clutch to be quickly and conveniently removed for the purpose of repairing or reconditioning, or replacement.

Figure 1:
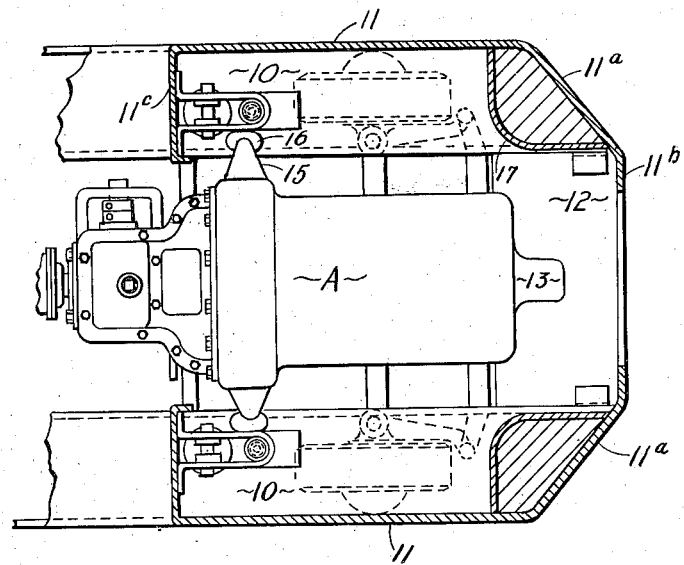
Figure 2:
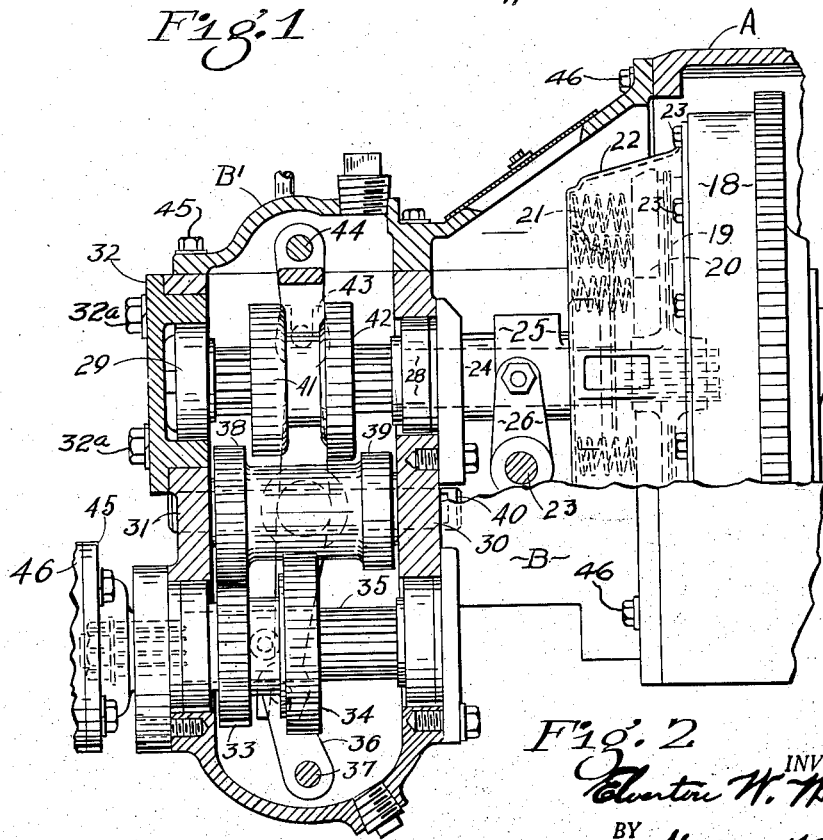

Further and more limited objects and advantages of my invention will be set forth in the specification hereof in connection with the accompanying drawings, wherein Fig. 1 represents a central plan view of the rear portion of a truck of the character shown in my aforesaid application and having my invention incorporated therewith; and Fig. 2 an enlarged detail in sectional elevation of the transmission and clutch mechanisms and of the housing for the said mechanisms.

Describing by reference characters the various parts illustrated herein, 10 denotes the horizontal flanges of the rear portions of the side rails or members of the truck frame and 11 the side body plates of a housing for the power plant, said plates having rear vertical ends which are bent inwardly, as shown at 11ª, to provide opposed bumper plates 11ᵇ which overhang the radiator (not shown) of the engine or power plant, the housing of which is indicated generally at A. The rear end of the power plant may be supported in any convenient manner from a transverse plate 12 which is supported by the side members, the said power plant having an overhanging projection 13 by which the rear end is supported by the plate 12. The front ends of the housing plates 11 are bent inwardly, as shown at 11ᶜ, extending across the tops of the side members.

The front of the power plant is supported from the side members 10 by feet or brackets 15, secured to the lower front end of the power plant housing and having their outer ends supported upon blocks 16. 17 denotes corner brace plates secured at their opposite ends respectively to the rear portions of the housing members 11 and to the bumper plate extensions 11ᵇ thereof and forming with the parts to which they are secured constructions approximating box girders in section, thereby to strengthen the rear corners of the truck and also to provide receptacles for materials constituting a counterweight for the mast and the load carrier (not shown) and for the loads which may be imposed upon the latter.

The transmission mechanism comprises the fly wheel 18 which is located within and adjacent to the enlarged front end of the housing A, the fixed clutch member 19 and the movable clutch plate 20, adapted to be held in engagement with the member 19 by springs 21, in the usual manner. 22 denotes the clutch cover plate which is secured to the fly wheel, as by means of bolts 23. This cover plate has a central opening for the passage therethrough of the clutch shaft 24 which also constitutes the input shaft for the transmission and on which is mounted the clutch collar 25, operated by the fork 26 and shaft 27 in the usual manner. B denotes the body section of a combined clutch and transmission housing which is secured at its rear end to the housing A. The large open front end of the body section B is closed by a front end wall section 31, preferably integral therewith. B' denotes the cover section of the combined clutch and transmission housing, the said cover section being secured at its front end to the front end wall section 31 and at its rear end to the housing A by bolts 45 and 46, respectively.

The shaft 24 is mounted in bearings 28 and 29, the former bearing being located in the rear end wall 30 of the transmission portion of the housing, which is carried by and is preferably integral with the body section B, and the latter bearing being located in a cap plate 32, which is removably secured by bolts 32ª within an opening provided in the upper portion of the front end wall section of the combined clutch and transmission housing.

33 and 34 denote gears of different diameter slidably mounted on the output shaft 35 and adapted to be moved along said shaft by the fork 36 mounted on the shaft 37, which is operated in the usual manner by the gear shift lever (not shown). These gears are adapted to mesh with fears 38 and 39 of different diameters mounted on a counter shaft 40 located above the shaft 35. 41 and 42 denote gears which are slidably mounted upon the input shaft 24 above the counter-shaft 40 and which are adapted to be shifted by means of the fork 43 and shaft 44. The gears 41 and 42 are of less diameter than the diameter of the opening provided in the front wall 31 for the reception of the cap plate 32.

When the gear 41 is in mesh with the gear 38, the output shaft 35 will be driven ahead at a speed determined by the ratios between the gears 41, 38 and 33. When the gears 33 and 34 are shifted to the right, thereby bringing the gear 34 into mesh with the gear 39, the output shaft will be driven forward at a different rate of speed determined by the ratios between the gears 41, 38, 39 and 34. By shifting the gear 41 out of mesh with the gear 38, the gear 42 may be brought into mesh with a gear on the counter shaft (not shown) whereby the output shaft may be driven in the opposite direction. As the construction of the reversing arrangement constitutes no part of the invention, it is believed that illustration of the same is unnecessary. Any customary construction and arrangement of countershaft and reversing gears may be provided and the reversing gears will be operated by an appropriate gear shift lever (not shown), the change speed gears being operated by the first-mentioned gear shift lever, the whole combination enabling two speeds forward and two speeds in reverse to be obtained, the forward and reverse gear ratios being preferably the same.

It will be noted that the output shaft 35 is located a considerable distance below the input shaft 24. This allows the engine to be supported in a convenient and efficient location and at the same time enables the output shaft to be located in operative relation to the shaft which drives the front driving wheels of the truck, which drive shaft may effect the driving of said wheels in the manner shown and described in my aforesaid application Serial No. 406,640. It will be noted further that the transmission portion of the shaft 24 and the shaft 40 and the geared portion of the shaft 35 are all located back of the front end wall section 31.

The construction shown and described herein provides means for convenient access to and removal of the clutch plate and of the clutch members 19 and 20 for the purpose of repair or replacement, this result being accomplished by first removing the cap 32, which permits the clutch shaft 24 to be withdrawn, after which the cover section B' of the transmission housing may be removed, thus providing convenient access to the clutch cover plate 22, whereby it may be removed and access may then be had to the clutch plate 29 and clutch member 19.

The front or outer end of the output shaft 35 is splined to the companion flange 45 of the flexible coupling 46, the opposite companion flange forming part of the means for driving the differential mechanism (not shown).

For convenience of description, the combined clutch and transmission housing and the clutch cover plate are considered as projecting forwardly from the housing A and from the fly wheel, but without any intention of limiting the construction shown, described and claimed herein for use only in connection with a power plant which is located at the rear of a vehicle instead of at the front thereof.

Having thus described my invention, what I claim is:

1. Transmission apparatus suitable for use in an industrial truck, the same comprising a flywheel, and a combined clutch and transmission housing including a body section secured to and extending from the flywheel housing and provided with a vertical end wall and a vertical wall located intermediately between the end wall and the flywheel, the said walls having aligned openings therein, a bearing in the opening of the intermediate wall, a bearing removably mounted in the opening of the end wall, a clutch shaft mounted in the said bearings and having transmission gears on the portion thereof intermediate of said bearings, a housing cover section removably secured to the body section, a clutch member on the said flywheel and a second clutch member cooperating with the first clutch member, both clutch members being located below the said housing cover section and the opening in the end wall being of greater diameter than the diameter of the transmission gears whereby the clutch shaft may be conveniently withdrawn from the said housing by removing the bearing from said opening and access may be had by the removal of the said housing cover section to the clutch members thereby to permit the ready removal of the same without detaching the transmission housing.

2. In the transmission apparatus set forth in claim 1, a cap plate removably secured within the opening in the end wall and wherein the end wall bearing is mounted, and the cover section being also secured at one end to the flywheel housing.

ELVERTON W. WEAVER.